(12) United States Patent
Saari et al.

(10) Patent No.: US 9,765,695 B2
(45) Date of Patent: Sep. 19, 2017

(54) COOLING ARRANGEMENT FOR A GAS TURBINE

(71) Applicant: LAPPEENRANNAN TEKNILLINEN YLIOPISTO, Lappeenranta (FI)

(72) Inventors: Esa Saari, Tampere (FI); Jaakko Larjola, Helsinki (FI); Juha Honkatukia, Lappeenranta (FI)

(73) Assignee: LAPPEENRANNAN TEKNILLINEN YLIOPISTO, Lappeenranta (FI)

( * ) Notice: Subject to any disclaimer, the term of this patent is extended or adjusted under 35 U.S.C. 154(b) by 157 days.

(21) Appl. No.: 14/441,784

(22) PCT Filed: Nov. 5, 2013

(86) PCT No.: PCT/FI2013/051040
§ 371 (c)(1),
(2) Date: May 8, 2015

(87) PCT Pub. No.: WO2014/072575
PCT Pub. Date: May 15, 2014

(65) Prior Publication Data
US 2015/0285146 A1 Oct. 8, 2015

(30) Foreign Application Priority Data
Nov. 12, 2012 (FI) .................................. 20120378

(51) Int. Cl.
*F02C 7/12* (2006.01)
*F01D 25/16* (2006.01)
(Continued)

(52) U.S. Cl.
CPC .................. *F02C 7/12* (2013.01); *F01D 5/08* (2013.01); *F01D 5/081* (2013.01); *F01D 5/085* (2013.01);
(Continued)

(58) Field of Classification Search
CPC ...... F02C 7/12; F02C 7/18; F02C 7/06; F02C 6/12; F01D 25/005; F01D 25/125;
(Continued)

(56) References Cited

U.S. PATENT DOCUMENTS 3,039,007 A * 6/1962 Williams ................ F01D 15/10
290/52
3,287,907 A * 11/1966 Arthur .................... F01D 25/30
415/116
(Continued)

FOREIGN PATENT DOCUMENTS

EP 0 187 486 A1 7/1986
GB 529799 A 11/1940

OTHER PUBLICATIONS

European Search Report, dated Jun. 24, 2016, from corresponding European Application No. 13853687.
(Continued)

*Primary Examiner* — Andrew Nguyen
(74) *Attorney, Agent, or Firm* — Young & Thompson

(57) ABSTRACT

A gas turbine arrangement, including a gas generator section (A), a power turbine section (B), and a generator section (C) coupled on a common shaft (10). The power turbine has its bearing block (12) provided with a copper cooling cup (9), which possesses a high thermal conductivity and conveys heat flux away from the side and block of the bearing and which has a design that enables the effect of a penetrating airflow.

9 Claims, 3 Drawing Sheets

Figure 1:
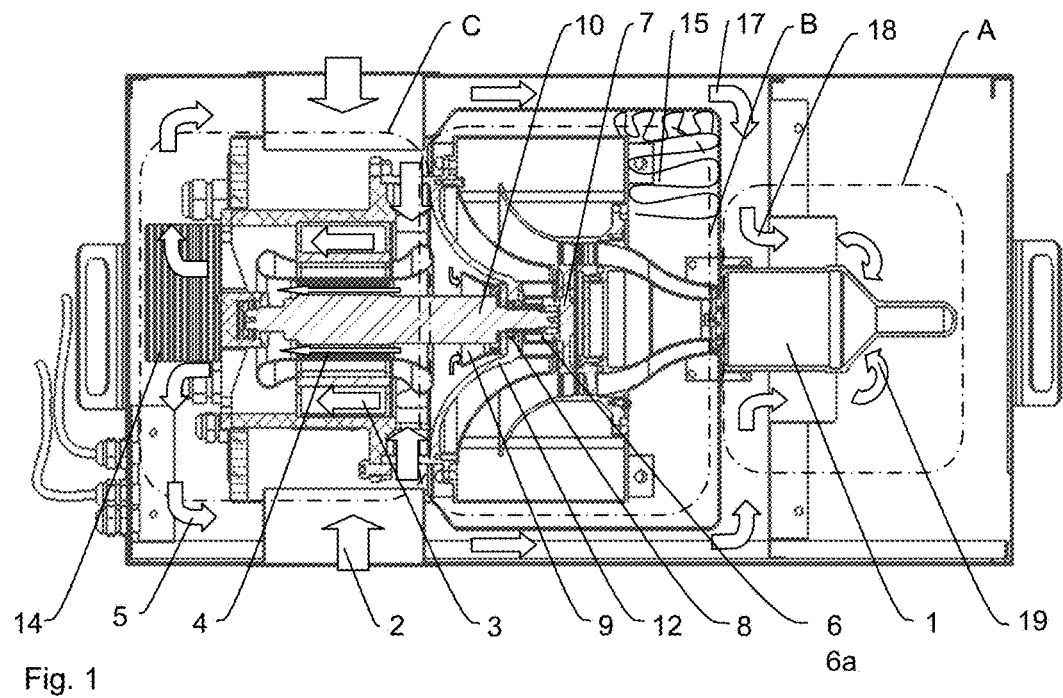

(51) Int. Cl.
*F02C 7/18* (2006.01)
*F01D 25/00* (2006.01)
*H02K 1/32* (2006.01)
*F01D 25/12* (2006.01)
*F01D 25/14* (2006.01)
*F02C 3/04* (2006.01)
*F02C 7/06* (2006.01)
*F01D 5/08* (2006.01)
*H02K 7/18* (2006.01)
*F01D 15/06* (2006.01)
*F01D 15/10* (2006.01)

(52) U.S. Cl.
CPC .......... *F01D 25/005* (2013.01); *F01D 25/12* (2013.01); *F01D 25/125* (2013.01); *F01D 25/14* (2013.01); *F01D 25/145* (2013.01); *F02C 3/04* (2013.01); *F02C 7/06* (2013.01); *H02K 1/32* (2013.01); *H02K 7/1823* (2013.01); *F01D 15/06* (2013.01); *F01D 15/10* (2013.01); *F05D 2220/76* (2013.01); *F05D 2220/768* (2013.01); *F05D 2250/82* (2013.01); *F05D 2300/171* (2013.01); *F05D 2300/172* (2013.01); *F05D 2300/5024* (2013.01); *Y02T 50/671* (2013.01); *Y02T 50/673* (2013.01); *Y02T 50/676* (2013.01)

(58) Field of Classification Search
CPC ..... F01D 25/16; F01D 25/162; H02K 7/1823; H02K 1/32; F05D 2220/768; F05D 2250/82; F16C 2360/24; F16C 37/00; F16C 37/002; F16C 37/007
See application file for complete search history.

(56) References Cited

U.S. PATENT DOCUMENTS

| | | | |
|---|---|---|---|
| 3,418,485 A | 12/1968 | Anderson et al. | |
| 3,490,746 A | 1/1970 | Bell | |
| 3,605,441 A | 9/1971 | Hagemeister | |
| 5,087,176 A * | 2/1992 | Wieland | F01D 5/025 415/177 |
| 5,201,796 A * | 4/1993 | Glinski | F02C 3/36 60/792 |
| 6,294,842 B1* | 9/2001 | Skowronski | F01D 15/10 290/7 |
| 7,562,519 B1 | 7/2009 | Harris et al. | |
| 2005/0193713 A1* | 9/2005 | Kovasity | F01D 15/10 60/39.08 |
| 2005/0244275 A1 | 11/2005 | Savile | |
| 2007/0120427 A1* | 5/2007 | Iund | E02F 9/207 310/54 |
| 2010/0052455 A1* | 3/2010 | Feng | H02K 1/276 310/156.08 |
| 2010/0284824 A1* | 11/2010 | Hippen | F01M 11/02 417/44.1 |

OTHER PUBLICATIONS

International Search Report, dated Feb. 13, 2014, from corresponding PCT application.
FI Search Report, dated Sep. 30, 2013, from corresponding FI application.

* cited by examiner

COOLING ARRANGEMENT FOR A GAS TURBINE

BACKGROUND OF THE INVENTION

The invention relates to a micro gas turbine, including a so-called gas generator which produces a hot exhaust gas under pressure, and a power turbine which drives an actual output-producing electric generator. The gas generator draws in large amounts of ambient air.

DESCRIPTION OF THE RELATED ART

Making up a gas turbine from a gas generator and a power turbine involves technology known as such. Hence, the starting point is usually a so-called pure jet engine (i.e. an aircraft engine without a bypass fan), wherein the combustion gas pressure prior to a jet nozzle is an overpressure of 0.3-0.9 bar. The jet nozzle is removed and the combustion gas under pressure is allowed to expand in a separate power turbine which drives an electric generator. Thereby, a jet engine producing just propulsion has been successfully converted into an electric power-producing gas turbine. Such a gas turbine is commonly referred to as an aeroderivative gas turbine with plenty of these in service i.a. as backup power plants.

What is typical for such aeroderivative gas turbines is that the manufacturer of a power turbine and an electric generator is a relatively small business, while the manufacturer of a jet engine used as a gas generator is a major company making thousands of such articles a year. The reason for this is that, because of extremely high temperatures, the gas generator is very difficult to manufacture, whereas the power turbine, as a result of distinctly lower temperatures, is clearly easier to both design and manufacture. The benefit of aeroderivative gas turbines is an attractive price by virtue of the gas generator being produced in large series, the downside being more maintenance demand and a shorter technical service life than those of so-called industrial gas turbines.

SUMMARY OF THE INVENTION

The design solution presented by the invention pertains to a so-called micro gas turbine operating on this principle. The micro gas turbines generally refer to a low capacity gas turbine with a typical output of less than 100 kW in distinction to traditional gas turbines with an output typically in the order of 5000-20000 kW. The smallest commercially manufactured micro gas turbine is probably the smallest model of a company called Capstone, which has an output of about 30 kW. The gas turbine contemplated in this invention has an output as low as 6 kW, which represents a breakthrough. Subsequently, it will be referred to as an ultra-micro gas turbine.

An advantage offered by the very small gas turbine or ultra-micro gas turbine over the combustion engine of equal capacity is its light weight (as much as five times lighter) and omnivorousness in terms of fuel (suitable fuels include e.g. fuel oil, bio-oil, and alcohol). A downside is the efficiency clearly poorer than in the combustion engine, especially in the absence of a recuperator. Hence, the ultra-micro gas turbine is appropriate for duties, wherein quite a high output is required over a relatively short time and it is desirable that this particular power unit be portable by a single person even in difficult terrain. Such applications can be found i.a. in fire and rescue service, disaster relief efforts, music festivals, air force, guerilla warfare units, and miscellaneous repair jobs regarding e.g. railways.

Because of its low output, the ultra-micro gas turbine must be simple and inexpensive, yet reliable in operation. For example, the lubrication of power turbine electric generator bearings cannot be performed by way of traditional circulating oil lubrication, but grease-lubricated bearings will have to do. Thus, in a power turbine, the turbine-side electric generator bearing must be cooled with special arrangements as the turbine disc is hot (500° C.). Because of grease lubrication, the temperature of this particular bearing may not be higher than about 110° C. Likewise, the cooling of an electric generator and the entire unit must be conducted in a manner as simple, inexpensive and reliable as possible.

A particular object of this invention is to raise the available prior art by presenting such an ultra-micro gas turbine cooling arrangement which fulfills the requirements set out in the preceding paragraph. The available prior art can be found e.g. in patent publications EP 0187486 A1, U.S. Pat. No. 3,418,485 A, GB 529799 A, U.S. Pat. No. 3,287,907 A, and U.S. Pat. No. 3,605,441 A.

DETAILED DESCRIPTION OF THE INVENTION

In accordance with the invention, there is provided a new gas turbine arrangement that comprises:
- a gas generator section,
- a power turbine section, and
- an electric generator section comprising a rotor coupled on a common shaft with a turbine disc of the power turbine section, wherein:
- a bearing block between the rotor and the turbine disc is provided with a cooling cup for conveying heat flux away from the bearing block and from a bearing supported by the bearing block, the cooling cup being shaped to enable airflow to penetrate the cooling cup,
- the turbine disc is mounted on the shaft with an attachment cup constructed from metal with a thermal conductivity less than that of iron, an open end of the attachment cup being attached to turbine disc and a bottom section of the attachment cup being attached to the shaft.

A gas turbine arrangement according to an exemplifying embodiment of the invention is characterized in that a bearing block 12 (FIGS. 1 and 2) of the power turbine is provided with a copper cooling cup 9, which possesses a high thermal conductivity and removes heat flux from the bearing side and block, and the design of which enables the effect of a penetrating airflow. In addition, the turbine disc 7 is mounted on an electric generator shaft by means of a thin-walled attachment cup 6 (FIGS. 1 and 2) made from stainless steel (poor thermal conductor), which may also function as a cooling air blower. Thus, as little heat as possible is conducted to the shaft from the turbine disc 7.

According to one embodiment of the invention, the electric generator is cooled by using a suitable channeling for conducting an intake air 19 for the gas generator 1 by way of air inlets 2 through an electric generator section C, on the one hand along channels 3 outside the stator, on the other hand through an air gap 4. The area ratio of these channels is selected in such a way that the resulting pressure drop in intake air is as insignificant as possible, yet in such a way that the cooling for surfaces defining the air gap is sufficient. At the same time, the intake air provides cooling for electronics 14 (a frequency converter or a rectifier, because the electric generator produces high frequency current) present at a cold end of the electric generator.

According to one embodiment of the invention, a turbine-side end 13 of the electric generator shaft (FIG. 3) can be made from stainless steel (poor thermal conductor) and connected with a tight interference fit to the rest of a rotor 10 (which must be made of a magnetic material).

Further characterizing features of the invention become apparent from the appended claims.

The structural solution according to the invention provides numerous benefits. The bearing assembly for a power turbine-electric generator shaft can be established by using inexpensive grease-lubricated bearings with no need for an expensive and heavy-duty circulating oil lubrication system. Furthermore, it enables the electric generator to be cooled in an effective and functionally reliable manner without a separate fan. This also provides a saving in the weight and enables the use of a very high power density in the electric generator, making the structures lighter and less expensive.

Figure 2:
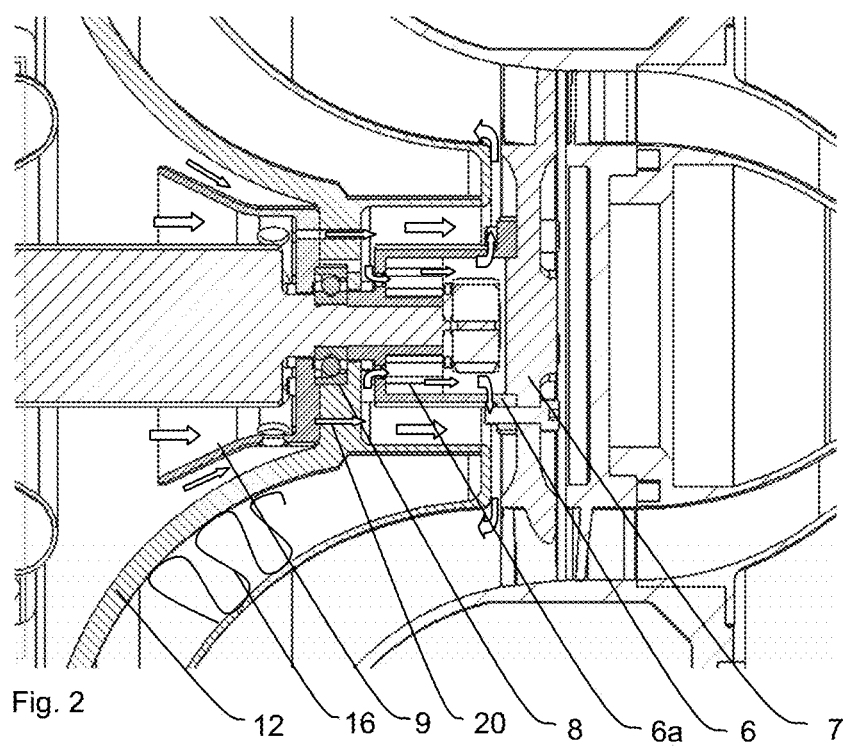
Figure 3:
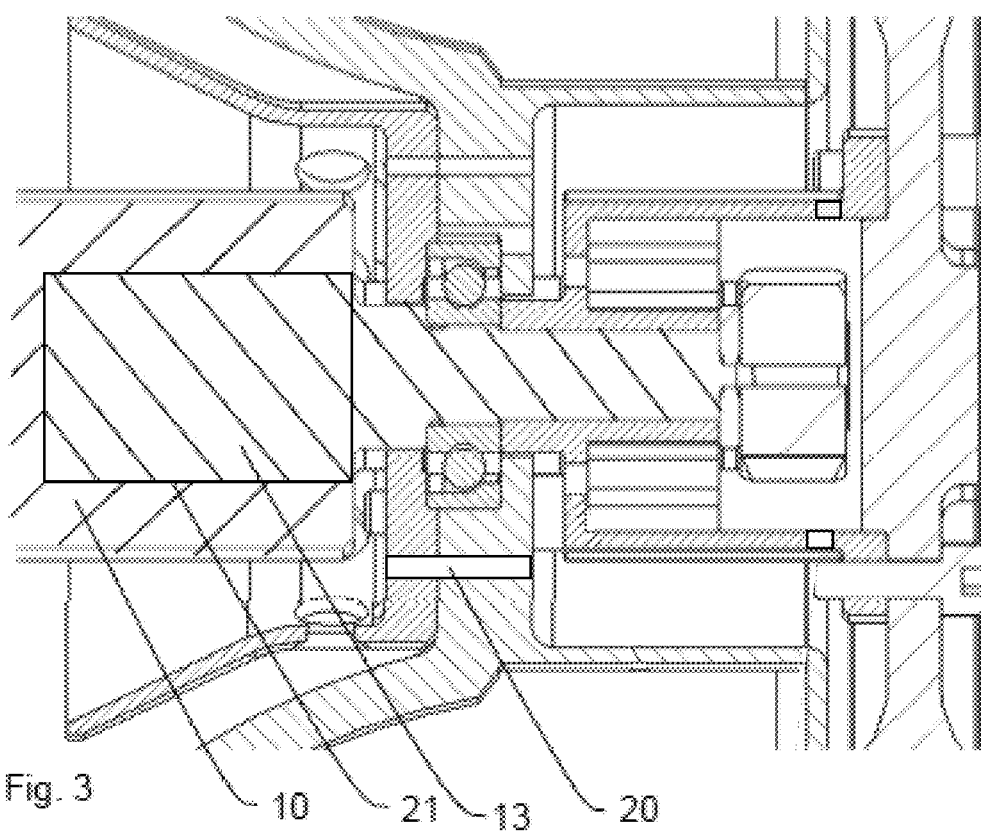

The invention and its operation will now be described with reference to the accompanying schematic drawings, wherein FIG. 1 shows an electric generator cooling system according to one embodiment of the invention, FIG. 2 shows a practice according to one embodiment of the invention to obstruct the transfer of heat from a turbine wheel to a bearing, FIG. 3 shows a practice according to one embodiment of the invention to make a turbine-side end of the electric generator shaft from stainless steel. In FIG. 1, the gas turbine section has been defined with a dashed line and marked with letter A and the gas generator within that section has been marked with numeral 1. The power turbine section has been defined with a dashed line and marked with letter B. The electric generator section has been defined with a dashed line and marked with letter C.

The ultra-micro gas turbine casing shown in FIG. 1 is channeled in view of enabling the large amount of air (white arrows) drawn in by a gas generator to be conducted with pressure losses as insignificant as possible through the electric generator section C, thus subjecting the electric generator and electronics associated therewith to effective cooling. Some of the air is used for the cooling of a turbine-side bearing 8 (FIG. 2). In addition to what is depicted in the figure, there is used insulation wool in a traditional way for impeding the conduction of heat, e.g. the space between a bearing block 12 and an exit channel cone being filled with insulation wool 16.

FIG. 2 shows a structural solution, wherein the rotating turbine disc 7 generates a suction which draws in some of the intake air by way of holes 20 in the bearing block. This flow is further enhanced by vanes 6a present in the attachment cup 6. The discussed attachment cup is constructed from thin-walled stainless steel (poor thermal conductor) for the amount of heat conducted to the shaft from the turbine disc to be as insignificant as possible. The flow of air is visualized by white arrows.

FIG. 3 shows a structural solution, wherein the electric generator shaft has its turbine-side end 13 made from stainless steel or other metal of poor thermal conduction and connected with a tight interference fit 21 to the rest of a rotor 10.

It should be appreciated that what is described above are just a few most preferred embodiments of the invention. Accordingly, it is obvious that the invention is not limited to the foregoing embodiments but has a wide range of applications within the scope defined by the appended claims in connection with various micro gas turbines. Although the primary topic of discussion with regard to the invention has involved ultra-micro gas turbines, the invention is naturally applicable for larger gas turbines as well. Likewise, the features presented in connection with various embodiments can just as well be used within the basic concept of the invention in connection with other embodiments and/or the described features can be put together for various combinations in case this is desirable and technical possibilities are available.

The invention claimed is:

1. A gas turbine arrangement comprising:
 a gas generator section,
 a power turbine section, and
 an electric generator section comprising a rotor coupled on a common shaft with a turbine disc of the power turbine section, wherein,
 a bearing block between the rotor and the turbine disc is provided with a cooling cup for conveying heat flux away from the bearing block and from a bearing supported by the bearing block, the cooling cup being shaped to enable airflow to penetrate the cooling cup, and
 the turbine disc is mounted on the shaft with an attachment cup constructed from metal with a thermal conductivity less than that of iron, an open end of the attachment cup being attached to the turbine disc and a bottom section of the attachment cup being attached to the shaft;
 wherein the cooling cup is arranged on a first axial side of the bearing and the attachment cup is arranged on a second axial side of the bearing, and
 wherein the electric generator section is cooled by using a channeling for conducting air through the electric generator section, along channels outside a stator of the electric generator section, and through an air gap of the electric generator section, where a portion of the air is diverted to form the airflow penetrating the cooling cup.

2. A gas turbine arrangement as set forth in claim 1, wherein the attachment cup is arranged to function as a cooling blower.

3. A gas turbine arrangement as set forth in claim 1, wherein the attachment cup is arranged to function as a cooling blower and a cooling blower effect is achieved with vanes and holes.

4. A gas turbine arrangement as set forth in claim 1, wherein the power turbine section has exhaust gas channels isolated from the bearing block with a first thermal insulation and isolated from air ducts with a second thermal insulation in a space between the exhaust gas channels and the air ducts.

5. A gas turbine arrangement as set forth in claim 1, wherein the rotor of the electric generator section is a permanent magnet rotor.

6. A gas turbine arrangement as set forth in claim 1, wherein the shaft has a turbine-side end made from a metal with a thermal conductivity less than a thermal conductivity of iron, and the turbine-side end of the shaft is connected with a tight interference fit to another portion of the shaft.

7. A gas turbine arrangement as set forth in claim 1, wherein the cooling cup is made of copper.

8. A gas turbine arrangement as set forth in claim 1, wherein the cooling cup comprises through holes for enabling the airflow to penetrate the cooling cup.

9. A gas turbine arrangement as set forth in claim 1, wherein the shaft has a turbine-side end made from stainless steel with a thermal conductivity less than a thermal conductivity of iron, and the turbine-side end of the shaft is connected with a tight interference fit to another portion of the shaft.

* * * * *